C. A. SHALER.
VULCANIZER.
APPLICATION FILED SEPT. 30, 1910.

1,158,315.

Patented Oct. 26, 1915.

UNITED STATES PATENT OFFICE.

CLARENCE A. SHALER, OF WAUPUN, WISCONSIN.

VULCANIZER.

1,158,315.   Specification of Letters Patent.   Patented Oct. 26, 1915.

Application filed September 30, 1910. Serial No. 584,588.

*To all whom it may concern:*

Be it known that I, CLARENCE A. SHALER, a citizen of the United States, residing at Waupun, county of Dodge, and State of Wisconsin, have invented new and useful Improvements in Vulcanizers, of which the following is a specification.

My invention relates to improvements in vulcanizers, with especial reference to that class of vulcanizers shown and described in my former application for Letters Patent of the United States, filed November 20, 1907, Serial No. 403018, and which are adapted for vulcanizing the interior surfaces of rubber tubing, such as the outer casing of a vehicle tire.

In the device shown in my former application, a segmental tube containing electrical heating coils was used to support the rubber tube or tire, which was bound to the heating or vulcanizing segment by means of a continuous band, or strip of tape, which was wound around the tire and around a down drawing member or segmental bar located underneath the heating segment and adjusted by means of screws to tighten the tape.

The object of the present invention is to provide a form of construction in which the necessity for adjusting the segmental bar underneath the heater will be avoided, and the desired pressure upon the tire may be secured by independent and removable devices adapted to apply lateral pressure to the tapes or bands.

In the following description, reference is had to the accompanying drawings, in which—

Figure 1:
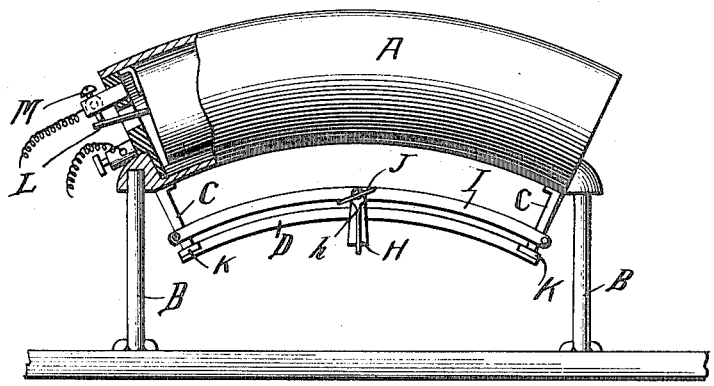
Figure 2:
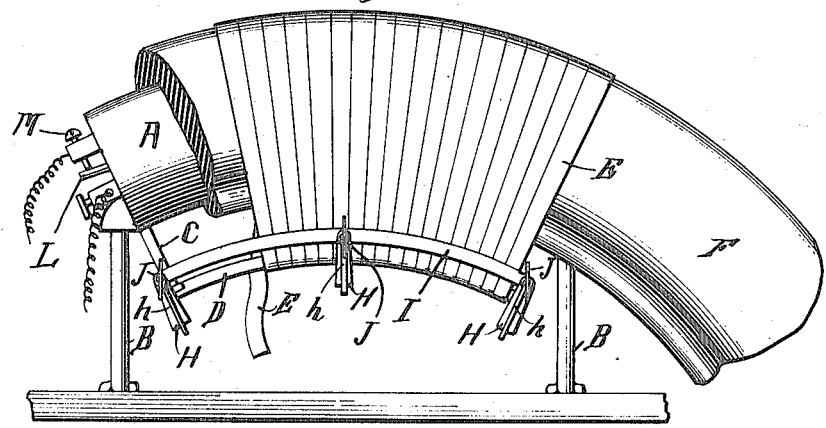
Figure 3:
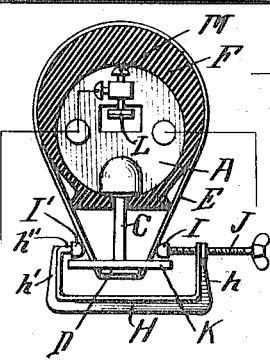
Figure 4:
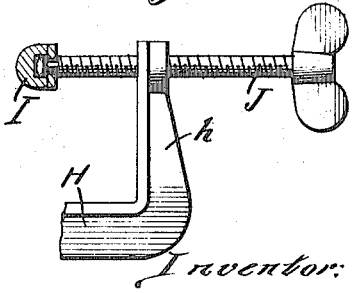

Figure 1 is an elevation of my invention with the tape removed, but with the compression bars and clamping members in position, one end of the heater being partially broken away to show the thermostatic regulator and the electrical connections. Fig. 2 is a similar view, showing the device as it appears in use, a portion of the tire being illustrated. Fig. 3 is an end view of the device with the supporting posts removed and also showing the device as it appears in use. Fig. 4 is a detail view, showing the swivel connection between the clamping set screw and the pressure bar.

Like parts are identified by the same reference characters throughout the several views.

The heater A is composed of a tubular segment similar to that illustrated in my former patent and preferably provided with electrical heating coils, although the source or character of the heat is not material to the present invention. The tubular segment A is supported upon standards B and is provided with depending brackets C, which support a stationary segmental bar D. A flexible band E, preferably comprising a strip of ordinary tape, is employed to bind the material to be repaired upon the heating segment A. The material, such as the outer casing F of a bicycle tire, is first adjusted over the heating segment and the tape E is then wound repeatedly around the casing and around the segmental bar D, as illustrated in Figs. 2 and 3. The bar D is located directly underneath the heating segment A and arches upwardly between the supporting posts B with substantially the same curvature as that of the heating segment A.

After the tape or band E is in the described position, a set of clamping yokes H are adjusted thereto. Each clamping yoke H is provided with upwardly projecting arms $h$ and $h'$, to which curved clamping bars I and I' are connected. The clamping bar I' is preferably rigidly secured to the inwardly extending extremities $h''$ of the clamping yokes. The clamping bar I is supported from the other arms $h$ of the clamping yokes by means of screws J, each of which screws has threaded engagement with the clamping yoke arms $h$ and swiveled engagement with the bar I. When adjusted to the position shown in Figs. 2 and 3, these bars I and the clamping yokes will be supported by cross bars K carried by the brackets C, and the tape or band E having previously been adjusted in position, it is obvious that by turning the screws J inwardly, tension will be applied to the tire F by the bars I and I', and the several lengths of the tape E against which said bars will be pressed to force the bands of tape inwardly into the space between the heating segment A and the stationary bar D. The bars I are formed of material which is sufficiently flexible to yield in the central portion, or at the ends where the screws J are located, and it is therefore obvious that the screws J can be so adjusted as to apply the greatest pressure at any desired point. The tire F will of course be first adjusted and the tape wound over the point at which repairs are required and the screws then adjusted to apply the greatest pressure at the exact point where repairs are needed. In the construction illustrated, the clamping bars I are also curved to conform with the curvature of the bar D and heating segment A. I have also illustrated the thermostatic bar L operating in connection with a contact screw M to control the heat secured by means of the electrical coils in the heater. These features are, however, not essential to my present invention.

After applying pressure to the tire or other material bound to the heating segment, as above described, the clamping set screws J may be adjusted outwardly to a sufficient extent to permit a removal of the clamping yokes and bars I and I' from the supporting cross bars K, after which the tapes may be unwound and the repaired article removed from the heating segment. The characteristic of removability in the clamping yokes and bars I and I' is a feature of considerable importance, since it permits the tapes to be wound into the desired position with great facility. It will, of course, be understood however that it is not absolutely essential that the clamping yokes H and bars I and I' be removed, since it is possible to manipulate the tape or band E into position past the bars I with the latter in position, but with the screws J retracted from the position to which they will be subsequently adjusted to apply binding pressure to the tape. It is also not essential to my invention that either the casing A, bar D, or clamping bars I and I' should be curved, the curved casing and bars being employed for repairing circular members, such as the casings of bicycle tires. It will of course be understood that these members would be straight if repairs were to be made upon straight lengths of material, whether comprising tubes or strips of rubber.

Having thus described my invention, what I claim as new and desire to secure by Letters Patent, is—

1. The combination with a tubular casing, provided with supporting standards, means for supplying heat to the interior of the casing, a stationary bar supported underneath the casing with the space between it and the casing open and unobstructed, a flexible band adapted to be wound about the casing and bar and to bind a tire upon the casing, and compression members for pressing said band inwardly along lines below a tire on the casing and between the casing and bar.

2. The combination of a heating casing, a stationary member substantially parallel to the casing, brackets rigidly connecting the stationary member with the casing, cross bars rigidly connected with the stationary member, a flexible binding member adapted to encircle the casing and the stationary member, and a set of clamping devices provided with clamping bars adapted to be supported by said cross bars in a position substantially parallel to and above the stationary member, said clamping devices being adapted to press said bars inwardly against the flexible binding member.

In testimony whereof I affix my signature in the presence of two witnesses.

CLARENCE A. SHALER.

Witnesses:
  Louis Schultz,
  Alvin J. Bronson.